United States Patent [19]

Hasan

[11] Patent Number: 4,712,959
[45] Date of Patent: Dec. 15, 1987

[54] WASHER WITH RESILIENT HEAD CRIPPING MEANS

[75] Inventor: Riaz Hasan, Palatine, Ill.

[73] Assignee: Illinois Tool Works Inc., Chicago, Ill.

[21] Appl. No.: 32,299

[22] Filed: Mar. 30, 1987

Related U.S. Application Data

[63] Continuation of Ser. No. 840,152, Mar. 17, 1986, Pat. No. 4,663,910.

[51] Int. Cl.⁴ .......................... F16J 15/10; E04D 3/36
[52] U.S. Cl. ...................................... 411/533; 52/410; 52/512; 411/368
[58] Field of Search ................. 52/410, 512, 411, 412; 411/531, 533, 542, 368, 369, 371

[56] References Cited

U.S. PATENT DOCUMENTS

| | | | |
|---|---|---|---|
| 4,074,501 | 2/1978 | Sandqvist | 52/410 X |
| 4,361,997 | 12/1982 | De Caro | 52/512 |
| 4,380,413 | 4/1983 | Dewey | 411/531 X |
| 4,545,270 | 10/1985 | Dewey | 52/512 X |
| 4,587,377 | 5/1986 | Rodseth | 411/533 |
| 4,630,984 | 12/1986 | Reinwall et al. | 411/533 X |
| 4,663,910 | 5/1987 | Hasan | 52/410 |

Primary Examiner—J. Karl Bell
Attorney, Agent, or Firm—David I. Roche; Thomas W. Buckman

[57] ABSTRACT

A washer for attaching insulation to a roof member over which roofing membrane is to be placed. The washer includes a laterally extending apertured flange and an upstanding hollow cylindrical protrusion adapted to snappingly engage the head of a fastener used with the washer. The protrusion has an inwardly extending lip on the inside surface of the free end of the protrusion. A resilient rib is disposed between the protrusion and the aperture in the washer. The rib resiliently urges the head of the fastener into engagement with the lip. The washer includes a downwardly extending hub, which may be equipped with means for retaining the washer in a batten strip.

4 Claims, 7 Drawing Figures

U.S. Patent  Dec. 15, 1987  Sheet 1 of 1  4,712,959
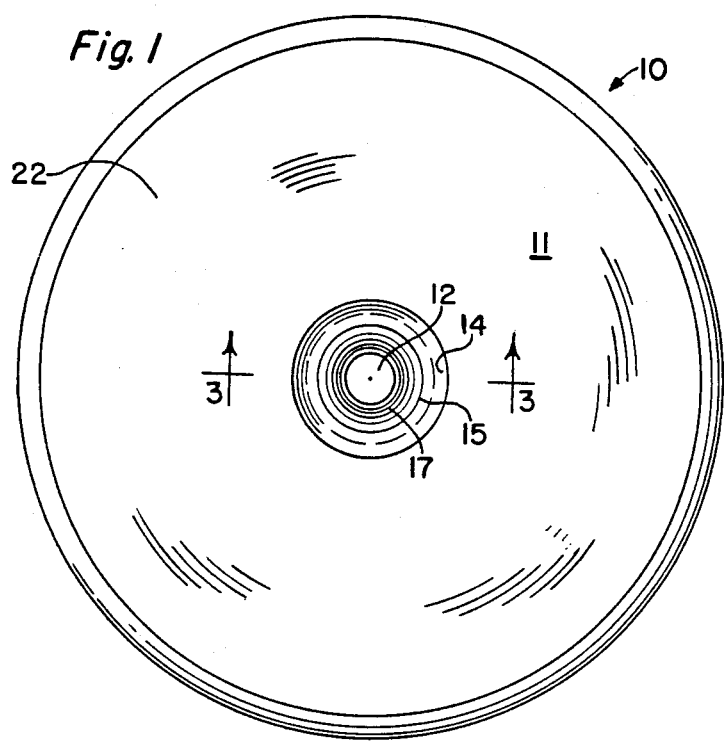
Fig. 1
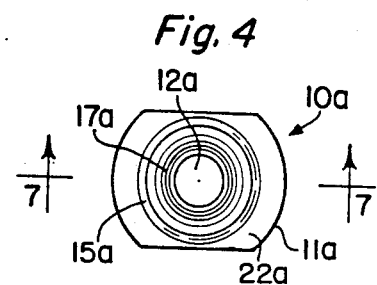
Fig. 4
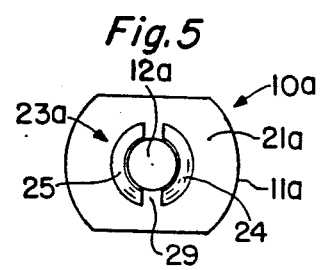
Fig. 5
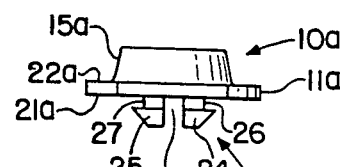
Fig. 6
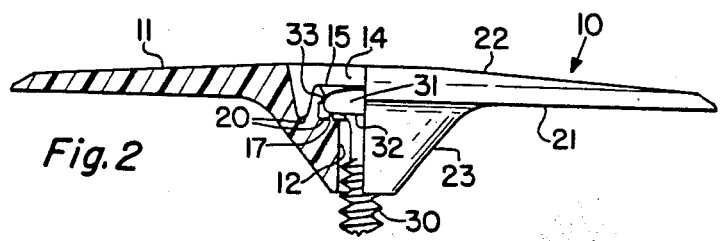
Fig. 2
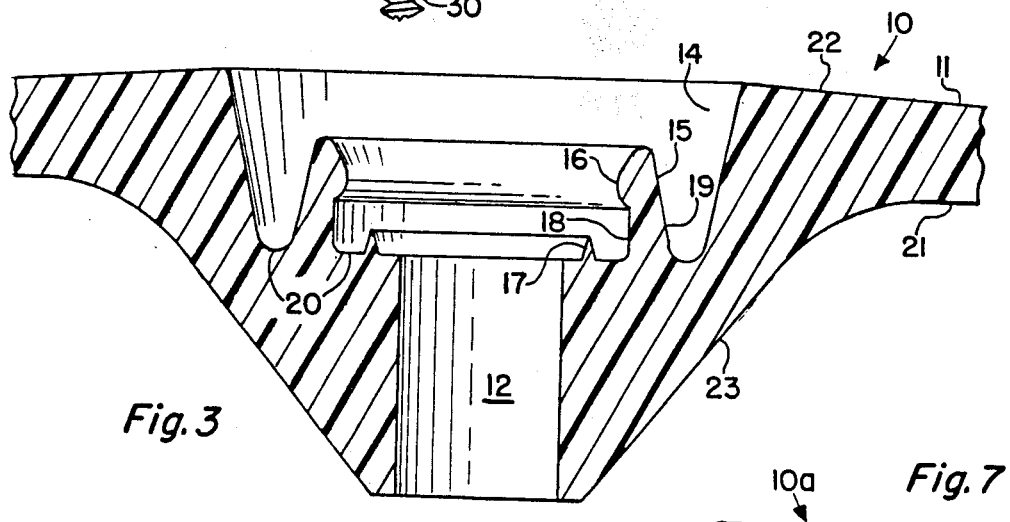
Fig. 3
Fig. 7

WASHER WITH RESILIENT HEAD GRIPPING MEANS

This is a continuation of application Ser. No. 840,152, filed Mar. 17, 1986 now U.S. Pat. No. 4,663,910.

BACKGROUND OF THE INVENTION

The present invention relates to a washer used to attach roofing insulation. The washer of the present invention is particularly useful in constructions where single ply roofing membranes are placed over the insulation.

The problem addressed by the present invention involves the puncture of membrane material by fastener heads. This problem arises when screws which are used to secure washers and insulation to a roof substructure become loose and move upward out of their installed positions. Such upward movement is usually attributable to vibration of some sort.

Attempts to eliminate this problem have taken several forms. For example, U.S. Pat. No. 4,361,997 to DeCarro shows engagement between the threads of a screw and the walls of a bore in a washer. Another attempt is the Tap Deck-SP fastener in which an annular ring on the shank of a fastener snaps through the aperture in a washer. A third attempt is shown in FIG. 3 of U.S. Pat. No. 4,074,501 to Sandquist. Sandquist shows a groove formed in a beveled bore. The edges of a countersunk screw head fit into the groove, and tend to prohibit backward motion of the screw.

U.S. Pat. No. 4,380,413 to George G. Dewey, which is owned by the assignee of the present invention, shows a screw and washer combination in which the head of a screw is loosely captivated within a recess in the washer.

It is an object of the present invention to provide a roofing insulation washer which prevents backward motion of a screw during vibration.

Another object of the invention is to provide a washer with means to easily and positively engage the head of a fastener used therewith.

Another object of the present invention is to provide a washer with means for firmly and resiliently gripping the head of a fastener used therewith.

Another object of the invention is to provide a washer in which engagement between the washer and the head of a fastener is easily obtained.

SUMMARY OF THE INVENTION

These and other objects of the invention are obtained with an apertured washer having a generally flat laterally extending flange, at least one axially extending somewhat cylindrical gripping protrusion formed around an aperture in the washer. The protrusion is somewhat cylindrical, and is disposed within a recess in the upper surface of the washer. A radially inwardly extending lip is disposed on the inner portion of the free end of the gripping protrusion. A small resilient annular rib is disposed between the aperture and the gripping protrusion. The annular rib urges the fastener head against the lip.

BRIEF DESCRIPTION OF THE DRAWINGS

Other features and advantages of the invention will become apparent from the following specification read with reference to the following drawings:

FIG. 1 is a top plan view of a washer embodying the present invention.

FIG. 2 is a side elevational view in partial section of the washer shown in FIG. 1.

FIG. 3 is a transverse sectional view of the washer taken along lines 3—3 of FIG. 1.

FIG. 4 is a top plan view of another embodiment of the present invention.

FIG. 5 is a bottom plan view of the embodiment shown in FIG. 4.

FIG. 6 is a side elevational view of the embodiment shown in FIGS. 4 and 5.

FIG. 7 is a transverse cross-sectional view taken along lines 7—7 of FIG. 4.

DETAILED DESCRIPTION OF THE INVENTION

FIGS. 1, 2 and 3 show an embodiment of the invention in which the washer 10 is comprised of a laterally extending flange 11 having a central aperture 12 and a protruding hub 23. A recess 14 is formed in the upper side 22 of the flange 11. Within the recess 14 there is a cylindrical protrusion or boss 15 which extends in an axial direction upwardly from a shoulder 20. The boss 15 is spaced laterally from the aperture 12. Between the boss 15 and the aperture 12 there is a smaller axially extending protrusion in the form of a rib 17. An overhanging lip 16 is formed on the inner free end of the boss 15.

As shown in FIG. 2, a screw 30 has a head 31 which is gripped by the rib 17 and the boss 15. The rib 17 is a resilient tapering rib which engages the underside 32 of the screw head. At the same time, the lip 16 engages the peripheral edge 33 of the top side of the screw head.

The details of the shape of the boss 15 are important. The upper portion of the lip 16 is sloped to act as a guide for the screw head 31. The inner wall 18 of the boss 15 is generally parallel to the axis of the aperture 12, while the outside wall 19 of the boss 15 is sloped inwardly from bottom to top. By placing the boss 15 in the recess 14, two benefits are obtained. First, the upper end of the boss 15 has a space into which it may deflect during the movement of the screw head 31 passed the lip 16. It has been found that the shape as shown in FIG. 3 allows lateral deflection of the boss 15 without resultant damage thereto. Also, because the boss 15 is positioned well below the surface 22 on the upper side of the washer, if a screw head fails to snap passed the lip 16, it will not interfere with a membrane draped over the washer. Vibrations resulting from wind or from sources within a structure can cause loosening and backward motion of roofing screws. The present invention minimizes the possibility of a screw backing up to a point where the screw head 31 projects above the upper surface 22 of the washer.

FIGS. 4–7 show an alternative embodiment of the present invention. In FIGS. 4–7 the designation "a" following a reference numeral is used to designate elements which correspond to the embodiment shown in FIGS. 1–3.

The embodiment of FIGS. 4–7 is intended to be used with a batten strip, as shown in FIG. 7. Batten strips are used to attach edges of roofing membranes. The strips are then covered with a membrane sheet which is adhesively attached to a section of underlying membrane adjacent to the batten strip. Thus, the problem of screw heads tending to loosen and puncture overlying membranes sheets is present with the use of batten strips in a manner similar to the problem associated with insulation fastening as discussed above.

The embodiment of FIGS. 4-7 is similar to the embodiment of FIGS. 1-3 in that the washer 10a includes a laterally extending flange 11a and an axially extending cylindrical protrusion or boss 15a surrounds an aperture 12a extending through the washer. The washer further includes a hub 23a depending from the bottom side of the washer. However, the hub has two legs 24 and 25 which are separated by a slot 29. The legs 24 and 25 have a circumferential notch 26 formed on the outside surface thereof. The notch 26 forms a shoulder 27 which engages a batten strip 40 as the washer is inserted through an aperture 41 in the batten strip.

The cooperation between the boss 15a and a screw head is substantially the same as the cooperation described with reference to the boss 15 and the screw 30 shown in FIG. 2 and discussed above.

While specific embodiments of the invention have been described in detail above, variations and modifications will become apparent to those skilled in the art. Such variations and modifications are intended to fall within the spirit and scope of the appendant claims.

I claim:

1. A washer for use in attaching insulation to a roof member with a fastener having a head and an elongated shank, said washer comprising a resilient non-metallic body having a central throughbore, a shoulder formed in said throughbore for engaging the head of a fastener, said shoulder defining and separating upper and lower portions of said throughbore, said upper portion having a maximum lateral dimension greater than that of said lower portion, restraining means formed in said upper portion of said throughbore for engaging a portion of said fastener head, resilient head pushing means formed on said shoulder for urging the fastener head into engagement with said restraining means.

2. A washer in accordance with claim 1 wherein said restraining means comprises a radially inwardly protruding annular lip adapted to snappingly engage the head of a fastener.

3. A washer in accordance with claim 1 wherein said pushing means is an axially extending generally annular rib having a V-shaped cross-section tapering from a wider base portion integrally formed with said shoulder to a narrower crest.

4. A washer in accordance with claim 1 wherein said body has a central hub depending from one side of said washer and a flange in snapped engagement with said hub.

* * * * *